United States Patent
Leskinen et al.

(10) Patent No.: US 10,233,271 B2
(45) Date of Patent: Mar. 19, 2019

(54) PROCESS FOR PRODUCING PROPYLENE POLYMER COMPOSITIONS

(71) Applicant: BOREALIS AG, Vienna (AT)

(72) Inventors: Pauli Leskinen, Helsinki (FI); Jingbo Wang, Linz (AT); Johanna Lilja, Porvoo (FI); Markus Gahleitner, Neuhofen/Krems (AT)

(73) Assignee: BOREALIS AG (AT)

( * ) Notice: Subject to any disclaimer, the term of this patent is extended or adjusted under 35 U.S.C. 154(b) by 0 days.

(21) Appl. No.: 15/578,599

(22) PCT Filed: Jun. 10, 2016

(86) PCT No.: PCT/EP2016/063299
§ 371 (c)(1),
(2) Date: Nov. 30, 2017

(87) PCT Pub. No.: WO2016/198601
PCT Pub. Date: Dec. 15, 2016

(65) Prior Publication Data
US 2018/0155475 A1 Jun. 7, 2018

(30) Foreign Application Priority Data

Jun. 12, 2015 (EP) .................................... 15171769

(51) Int. Cl.
*C08F 210/16* (2006.01)
*C08F 210/06* (2006.01)
*C08L 23/14* (2006.01)

(52) U.S. Cl.
CPC .......... *C08F 210/16* (2013.01); *C08F 210/06* (2013.01); *C08L 23/14* (2013.01)

(58) Field of Classification Search
CPC .................................................. C08F 110/06
USPC ........................................................ 526/351
See application file for complete search history.

(56) References Cited

U.S. PATENT DOCUMENTS

| | | | | |
|---|---|---|---|---|
| 6,221,974 B1* | 4/2001 | Harkonen | ............... | F16L 9/133 502/132 |
| 2012/0101240 A1* | 4/2012 | Haikarainen | ........... | C08F 10/06 526/130 |
| 2014/0378298 A1* | 12/2014 | Kipiani | .................... | C08F 10/06 502/107 |
| 2016/0312018 A1* | 10/2016 | Vestberg | ............... | C08F 210/06 |

FOREIGN PATENT DOCUMENTS

| | | |
|---|---|---|
| CN | 103531112 A | 1/2014 |
| EP | 887380 B1 | 2/2004 |
| EP | 2 558 508 B1 | 2/2013 |
| EP | 2610271 A1 | 7/2013 |
| EP | 2610272 A1 | 7/2013 |
| EP | 2610273 A1 | 7/2013 |
| JP | 2010-535863 A | 11/2010 |
| WO | 98/58971 A1 | 12/1998 |
| WO | 98/58976 A1 | 12/1998 |
| WO | 98/58977 A1 | 12/1998 |
| WO | 2004/029112 A1 | 4/2001 |
| WO | 2009/019169 A1 | 2/2009 |
| WO | 2012/007430 A1 | 1/2012 |
| WO | 2012/159927 A1 | 11/2012 |
| WO | WO-2014139811 A2 * | 9/2014 ............ C08F 210/06 |
| WO | 2014/206950 A1 | 12/2014 |
| WO | 2015/082379 A1 | 6/2015 |
| WO | 2015/101593 A1 | 7/2015 |

OTHER PUBLICATIONS

Office Action for Chinese Patent Application No. 201680018504.3.
Office Action for Chinese Patent Application No. 201680018504.3., dated Sep. 30, 2018.
Office action for Korean Patent Application No. 10-2017-7031757, dated Feb. 18, 2018.

* cited by examiner

*Primary Examiner* — William K Cheung
(74) *Attorney, Agent, or Firm* — Tarolli, Sundheim, Covell & Tummino LLP

(57) ABSTRACT

The present invention relates to a process for producing polypropylene polymer composition by polymerizing propylene with a C4 to C8 a-olefin comonomer and with ethylene in a sequential polymerization process with at least two reactors connected in series in the presence of a solid Ziegler-Natta catalyst component being free of external carrier material and any phthalic compounds, and wherein the C4 to C8 a-olefin comonomer content in the propylene polymer composition is at least 4.5 wt-%.

12 Claims, No Drawings

PROCESS FOR PRODUCING PROPYLENE POLYMER COMPOSITIONS

This application is a Section 371 National Stage Application of International PCT application PCT/EP2016/063299 filed Jun. 10, 2016, which claims priority to European application EP 15171769.1 filed Jun. 12, 2015; which is hereby incorporated by reference in its entirety.

The present invention is directed to a new process for producing propylene polymer compositions. More specifically the present invention is directed to a process for producing propylene terpolymer compositions comprising ethylene and a C4 to C8 α-olefin comonomers. Further, the invention is directed to the propylene terpolymer compositions prepared by the process of the invention and use of said propylene terpolymer compositions for producing articles.

Polypropylenes are suitable for many applications. For instance propylene co- and terpolymer compositions are applicable in packaging industry, and especially in areas where sealing properties play an important role, like in the food packing industry. Irrespectively from the polymer type, a polymer must fulfill all desired end properties for desired end applications.

In process point of view good comonomer incorporation, i.e. good comonomer conversion and comonomer response are desired not only to reach better process economics, but also to reach lower volatile amounts in the final polymer without the need of extensive after-treatment steps for removing any residual hydrocarbons. Volatile compounds originate typically from monomers not reacted during the polymerization process. Especially higher monomers containing four or more carbon atoms tend to be less reactive and thus cause problems, like deterioration in organoleptic properties. However, using such monomers is on the other hand advantageous for many polymer properties.

In many packing applications, where sealing of surfaces is needed, the seal which is formed between the surfaces to be sealed is put under load while it is still warm. This means that the hot-tack properties of the polypropylene compositions are crucial to ensure that a strong seal is formed even before final cooling. Further, low sealing initiation temperature (SIT) is desired. In many applications it's desired to operate, e.g. during the sealing process, at as low temperature as possible. The benefit of using a lower temperature is in addition to the obvious energy and cost saving, that the article to be sealed is not exposed to a too high temperature. High temperatures are often to be avoided e.g. in food packaging applications. When lower sealing temperatures are used, the material to be sealed should have a broad melting curve and a low sealing initiation temperature in order to achieve the good, desired sealing properties. In addition a broad sealing temperature window is often desired.

Recently there has been also increased demand to produce polymers without using any phthalate containing components. Especially in baby care, food and medical industry such demands are of high priority. Propylene polymers are commonly produced by using solid, supported Ziegler-Natta catalysts, which typically contain phthalates as internal electron donors. Therefore it is highly desired to find processes, where catalysts prepared without any phthalic compounds, are used.

Further, in some applications, especially in film applications, a homogeneous film surface, is required. Catalyst residues, especially catalyst carrier residues, like silica or $MgCl_2$, might be harmful in final products, especially in film products. Therefore a polymer material being free of such possible residues is desired.

Propylene polymer compositions, comprising higher α-olefins, like α-olefin of 4 to 8 C-atoms and optionally ethylene as comonomers, are as such known in the art. Further, propylene terpolymers have been used e.g. as packaging material also in food industry.

However, as indicated above, there is room to improve the properties of propylene terpolymer compositions and the process for producing thereof.

WO9858971 discloses terpolymer compositions comprising a mixture of two different terpolymer compositions. Polymer is produced in a process comprising a combination of slurry and gas phase reactors. As catalyst is used a $MgCl_2$ supported Ziegler-Natta catalyst.

WO2009/019169 discloses a process for producing propylene terpolymer comprising as comonomers ethylene and an alpha-olefin of 4-8 C atom. Process is carried out in gas-phase reactor comprising two interconnected polymerization zones. As catalyst is used $MgCl_2$ supported Ziegler-Natta catalyst.

EP 2 558 508 discloses a propylene-ethylene-hexene terpolymer produced by using a $MgCl_2$ supported Ziegler-Natta catalyst. The terpolymer produced is defined to have hexene content of 2 to 4 wt-% and ethene content of 1 to 2.5 wt-% and produced in two interconnected fluidized bed reactor.

Single site catalysts have also been used in a process for producing propylene copolymers. However, even though the final polymers might have desired properties, single site catalysts are much more sensitive and demanding catalysts in full scale polymerization process. Therefore use of more robust Ziegler-Natta catalysts is preferred in process point of view. But, as disclosed above, the final polymer properties or balance of properties have not been satisfactory in targeted propylene polymer compositions produced with Ziegler-Natta catalysts.

Drawbacks in known terpolymers relate to a missing balance with desired properties, like the amount of solubles, melt temperature and sealing properties, to problems in process operability and in further processing of the polymer, to problems relating to the too high volatile amounts of the final polymer. Further, the use of catalysts containing non-desired phthalic compounds is in many applications problematic, or even forbidden. if even Accordingly, the object of the present invention is to provide an improved process for producing polymer compositions from propylene, a C4 to C8 α-olefin comonomer and ethylene, the compositions exhibiting good balance between desired properties, like good hot tack properties, low heat sealing initiation temperature (SIT), broad sealing temperature window, meaning a wide range between the sealing end temperature (SET) and SIT, a surprising relation between melting temperature and amount of solubles, low amount of volatile organic compounds (VOC) and further not comprising any phthalic compounds originating from compounds used in the process. Further, one object is to provide a process, where the C4 to C8 comonomer conversion, or comonomer response, is on a good level, resulting in good process economics as well in desired properties.

Thus, the present invention is directed to a process for preparation propylene polymer compositions from propylene, a C4 to C8 α-olefin comonomer and ethylene and said compositions obtainable or obtained by the process of the invention. Not only the type of comonomers, but also the amount of the comonomers, especially the amount of C4 to C8 α-olefin comonomer in the final polymer is an essential feature for achieving the desired properties. Thus, the present invention is especially directed to a propylene polymer composition from propylene, at least a C4 to C8 α-olefin comonomer and ethylene obtainable or obtained by the process of the invention, wherein the amount of the C4 to C8 α-olefin comonomer is at least 4.5 wt-% in the final polymer. Amount of ethylene in the polymer composition is smaller.

Further, the present invention provides a propylene terpolymer composition formed from propylene, a C4 to C8 α-olefin comonomer and ethylene, where the amount of the C4 to C8 α-olefin comonomer is at least 4.5 wt-% in the final polymer.

SUMMARY OF THE INVENTION

Accordingly, the present invention provides a process for the preparation of propylene polymer compositions (P), comprising polymerizing propylene with a C4 to C8 α-olefin comonomer and ethylene in a sequential polymerization process comprising at least two reactors connected in series, wherein said process comprises the steps of
(A) polymerizing in a first reactor (R-1) propylene, optionally a C4 to C8 α-olefin comonomer and optionally ethylene, and obtaining a propylene polymer fraction (A),
(B) transferring said propylene polymer fraction (A), optionally with unreacted propylene monomers and optionally with the unreacted optional ethylene and C4 to C8 α-olefin comonomers from the first reactor into a second reactor (R-2),
(C) feeding to said second reactor (R-2) additional propylene, optionally additional C4 to C8 α-olefin comonomer and optionally additional ethylene,
(D) polymerizing propylene, optionally C4 to C8 α-olefin comonomer and optionally ethylene in said second reactor (R-2), in the presence of said propylene polymer fraction (A), and
obtaining the propylene polymer composition (P) comprising the propylene polymer fraction (A) and a propylene polymer fraction (B) produced in said second reactor (R-2), wherein the C4 to C8 α-olefin, and the ethylene comonomers are fed at least to one of the reactors (R-1) and (R-2), and wherein the propylene composition (P) comprises C4 to C8 α-olefin comonomer in an amount of at least 4.5 wt-%, and
wherein
the polymerization takes place in the presence of a solid catalyst component (SC) having a surface area measured according to ASTM D 3663 of less than 20 m2/g, being free of any external carrier material, and
comprising
(a) a transition metal compound selected from one of the groups 4 to 6 of the periodic table (IUPAC),
(b) a compound of a metal selected from one of the groups 1 to 3 of the periodic table (IUPAC), and
(c) a non-phthalic internal electron donor (ID), and
wherein said solid catalyst component (SC) does not contain any phthalic compounds.

Propylene polymer fraction (A) can be a propylene homopolymer or propylene copolymer with ethylene or with C4 to C8 α-olefin comonomer, or propylene-ethylene-C4 to C8 α-olefin terpolymer depending on the feed of comonomers.

The final propylene polymer composition (P) has C4 to C8 α-olefin monomer content of at least 4.5 wt-%, preferably in the range of 4.5 to 14 wt-%. The ethylene content is at least 0.3 wt-%, preferably in the range of 0.5 to 3.0 wt-%.

Thus, the present invention is directed to a propylene polymer composition (P) having C4 to C8 α-olefin monomer content of at least 4.5 wt-%, preferably in the range of 4.5 to 14 wt-% and ethylene content of at least 0.3 wt-%, preferably in the range of 0.5 to 3.0 wt-%. Further, the present invention relates to said polymer composition obtainable or being obtained by the process f the invention.

C4 to C8 α-olefin monomer is preferably C4 to C6 α-olefin monomer, more preferably 1-butene or 1-hexene, especially 1-butene.

The instant propylene polymer compositions are produced in a sequential polymerization process. The term "sequential polymerization process" indicates that the propylene polymer composition is produced in at least two reactors connected in series. In one preferred embodiment the term "sequential polymerization process" indicates in the present application that the polymer of the first reactor (R-1), i.e. the propylene homo-, co- or terpolymer fraction (A), is directly conveyed with unreacted monomers to the second reactor (R-2) in which the propylene terpolymer fraction (B) is produced. Accordingly, a decisive aspect of the present process is the preparation of the propylene polymer composition in at least two separate reactors, wherein the reaction mixture of the first reactor (R-1) is conveyed, preferably directly conveyed, to the second reactor (R-2), and thus the propylene polymer compositions comprise two fractions, namely fractions (A) and (B). Accordingly, the present process comprises at least a first reactor (R-1) and a second reactor (R-2). The process may comprise at least one additional polymerisation reactor subsequent to reactor (R-2). In one specific embodiment the instant process consists of two polymerization reactors (R-1) and (R-2). The term "polymerization reactor" indicates a reactor, where the main polymerization takes place. Thus in case the process consists of two or more polymerization reactors, this definition does not exclude the option that the overall process comprises for instance a pre-polymerization step in a pre-polymerization reactor. The term "consists of" is only a closing formulation in view of the main polymerization reactors. In case the process configuration comprises a pre-polymerization reactor, fraction (A) means the sum of (co)polymers produced in the pre-polymerization reactor and in the first polymerization reactor (R-1).

The polymerization reactors are selected from slurry and gas phase reactors.

The first reactor (R-1) is preferably a slurry reactor (SR) and can be any continuous or simple stirred batch tank reactor or a loop reactor operating in bulk or slurry. By "bulk polymerization" is meant a process, where the polymerization is conducted in a liquid monomer essentially in the absence of an inert diluent. However, as it is known to a person skilled in the art, the monomers used in commercial production may contain aliphatic hydrocarbons as impurities. For instance, the propylene monomer may contain up to 5% of propane as an impurity. Thus, preferably polymerization in bulk means polymerization in a reaction medium that comprises of at least 60% (wt/wt) of the monomer. According to the present invention the slurry reactor (SR) is preferably a (bulk) loop reactor (LR).

The second reactor (R-2) is preferably a gas phase reactor (GPR). Such gas phase reactor (GPR) can be any mechanically mixed or fluidized bed reactor or settled bed reactor. Preferably the gas phase reactor (GPR) comprises a mechanically agitated fluidized bed reactor with gas velocities of at least 0.2 msec. The gas phase reactor of a fluidized bed type reactor can further include a mechanical agitator to facilitate the mixing within the fluidized bed.

The optional additional reactor is preferably a gas phase reactor.

A preferred multistage process is a "loop-gas phase"-process, such as developed by Borealis (known as BORSTAR® technology) described e.g. in patent literature, such as in WO-A-98/58976, EP-A-887380 and WO-A-98/58977.

Preferably in the first reactor (R-1), preferably in the slurry reactor (SR), like in the loop reactor (LR), the temperature is equal or more than 60° C., preferably in the range of equal or more than 60° C. to equal or below 90° C., still more preferably in the range of equal or more than 60° C. to equal or below 85° C., like in the range of 62° C. to equal or below 80° C., or even equal or below 75° C.

The pressure in the first reactor (R-1), preferably in the slurry reactor (SR), like in the loop reactor (LR), is not a critical issue, however, is typically within the range of 15 bar to 100 bar, preferably between 25 bar to 80 bar, more preferably 35 to 70 bar. Hydrogen can be added into the reactor for controlling the molar mass in a manner known per se.

Subsequently, the reaction mixture from the first reactor (R-1) is transferred to the second reactor (R-2), i.e. to the gas phase reactor (GPR-1), whereby the temperature in the second reactor (R2) is preferably within the range of equal or more than 65° C. to equal or below 90° C., more preferably of equal or more than 65° C. to equal or below 85° C., still more preferably equal or more than 65° C. to equal or below 80 C. The higher temperature can be even equal or below 75° C.

Further it is preferred that in the second reactor (R-2), preferably in the gas phase reactor (GPR-1), the pressure is within the range of 5 bar to 50 bar, preferably between 15 bar to 40 bar, more preferably 20 to 30 bar. Hydrogen can be added for controlling the molar mass in a manner known per se.

The residence time can vary in both reactor zones.

In one embodiment of the process for producing propylene polymer compositions of the present invention the residence time in the bulk reactor, e.g. loop reactor, is in the range 0.2 to 4 hours, e.g. 0.3 to 2.0 hours, more preferably in the range of 0.4 to 1.5 h, and the residence time in gas phase reactor (GPR) will generally be 0.2 to 6.0 hours, like 0.5 to 4.0 hours, more preferably 1 to 2.0 h.

The present process preferably encompasses a pre-polymerization (Pr) prior to the polymerization in the first reactor (R-1). The pre-polymerization (Pr) can be conducted in the first reactor (R-1), however it is often preferred in commercial processes that the pre-polymerization (Pr) takes place in a separate reactor, so called pre-polymerization reactor (Pr-R). A pre-polymerization reactor is of smaller size compared to the first (R-1) and second (R-2) reactor, respectively. The reaction volume of the pre-polymerization reactor (Pr-R) can be e.g. between 5% and 40% of the reaction volume of the first reactor (R-1), like the loop reactor. In said pre-polymerization reactor (Pr-R), the pre-polymerization (Pr) is performed in bulk or slurry as defined for the first reactor (R-1) above.

Further it is appreciated that the pre-polymerization temperature is rather low, i.e. equal or below 50° C., more preferably between equal or more than 10° C. to equal or below 50° C., yet more preferably between 12 to 45° C., even more preferably between 15 to 40° C., like between 20 and 35° C.

The pressure during pre-polymerization can be between 20 to 80 bar, preferably between 25 to 75 bar, like 30 to 70 bar, or 40 to 60 bar. Residence times can vary between 0.1 to 1.0 hours, like between 0.2 and 0.6 hours, typically 15 to 30 minutes.

According to the process of the invention the C4-C8 α-olefin comonomer and ethylene can be fed independently into the polymerization process i) into the first reactor (R-1) only, whereby any unreacted comonomers can be, preferably are, transferred to the second reactor together with the propylene polymer fraction produced in R-1 (A), or ii) comonomers are fed into the first reactor (R-1) and in addition to the unreacted comonomers from the first reactor additional comonomer is fed into the second reactor (R-2), or iii) no comonomers are fed into the first reactor (R-1), but are fed only into the second reactor (R-2).

Feeding the C4-C8 α-olefin comonomer and ethylene independently into the polymerization process means that it is possible that both C4-C8 α-olefin comonomer and ethylene are fed to the same reactor(s) or C4-C8 α-olefin comonomer or ethylene are fed into different reactors.

In one embodiment of the present invention a C4 to C8 α-olefin comonomer is fed to the first reactor (R-1), and ethylene is fed into the first reactor (R-1) or ethylene is fed into the second reactor (R-2) or into the first reactor (R-1) and into the second reactor (R-2) of the process.

According to another embodiment of the invention, only ethylene is fed to the first reactor (R-1). In that case a C4 to C8 α-olefin comonomer is to be fed to the second reactor (R-2). Optionally, additional ethylene can be fed to the second reactor (R-2).

In another embodiment, both ethylene and a C4 to C8 α-olefin comonomers are fed to the first reactor (R-1). In this embodiment of the invention, no further comonomers are fed into the second reactor (R-2), or only ethylene or only C4 to C8 α-olefin is fed as a comonomer into the second reactor (R-2) or both ethylene and C4 to C8 α-olefin are fed into the second reactor (R-2).

It has to be noted that in case the C4-C8 α-olefin comonomer is fed to the both reactors, the same C4-C8 α-olefin comonomer is fed to the both reactors.

Production split between the first and second reactors, i.e. the ratio (as wt-%) of polymer produced in each reactor is in the range of 20:80 to 20:80, preferably in the range of 30:70 to 70:30, still more preferably in the range of 35:65 to 65:35.

In all embodiments of the present invention C4 to C8 α-olefin is preferably C4 to C6 α-olefin, more preferably 1-butene or 1-hexene, especially 1-butene.

It is preferred to purge the polymer after the polymerisation to reduce the amount of residual hydrocarbons in the polymer. Typically the purging step is conducted in a purge vessel where the polymer is contacted with a purge gas, conventionally nitrogen. The temperature during the purging step is from 30 to 110° C., preferably from 30 to 95° C. and more preferably from 40 to 80° C. The average residence time is from 5 to 240 minutes, preferably from 10 to 200 minutes. Catalyst residues are deactivated with steam or moisturised air.

Preferably the purging step is conducted continuously. In a preferred embodiment the polymer particles are introduced to the top of the purge vessel and removed from the bottom. Thereby a downward flow of polymer particles is established. The purge gas is typically introduced at the bottom of the purge vessel so as to achieve a counter-current flow of particles and gas. The gas flow is selected so that no fluidization of the polymer particles occurs in the purge vessel. Thereby a narrow residence time distribution of the polymer particles is obtained and the process has a good efficiency.

Catalyst The catalyst used in the present invention is a Ziegler-Natta catalyst comprising a specific solid catalyst component. Said solid catalyst component and preparation thereof is described below.

As indicated above, one further important aspect of the present invention is that a specific solid catalyst component must be used in the instant polymerization process.

Said solid catalyst component (SC) is free of any external support material and comprises
(a) a compound of a transition metal selected from one of the groups 4 to 6, in particular of group 4 of the periodic table (IUPAC), preferably Ti,
(b) a compound of a metal selected from one of the groups 1 to 3 of the periodic table (IUPAC), preferably of group 2 of the periodic table (IUPAC), in particular Mg,
(c) a non-phthalic internal electron donor (ID).

The solid catalyst component can optionally contain an aluminium compound (d).

The solid catalyst component does not contain any phthalic compounds.

In addition to the solid catalyst component (SC) the polymerization catalyst typically comprises cocatalyst(s), like an organo aluminium compound and external electron donor(s), like an organo silane compounds as is well known in the art and will be described in more detail later. These components are not part of the solid catalyst component as defined above, but are fed separately to the polymerization process.

A remarkable feature of the used catalyst component (SC) is that it is of solid form. In other words for the propylene polymer composition (P) polymerization an heterogeneous catalysis is applied, i.e. the aggregate state (solid state) of the catalyst component (SC) differs from the aggregate state of the reactants, i.e. the propylene, ethylene and other α-olefins used. Different to traditional known solid catalysts, the catalyst component (SC) used in the present invention is a so-called self-supported catalyst system, or in other words in the solid catalyst component (SC) active catalyst components are not supported on any external support or carrier material. Thus, the solid catalyst component used in the present invention does not comprise in any significant amounts of catalytically inert material which is normally used as support material. Inert support material is understood to be in this application any material which is used to decrease solubility of the catalyst systems in polymerizations media as well in common solvents like pentane, heptane and toluene. Typical inert support materials used in typical prior art supported catalysts are organic and inorganic support materials, like silica, $MgCl_2$ or porous polymeric material. These support materials are generally used in amounts of at least 50 wt.-%, more preferably of at least 70 wt.-% in prior art catalysts.

However, the solid catalyst component (SC) used in the present invention, is prepared without using any external support material and thus the amount of such an inert support material within the solid catalyst component (SC) is of not more than 10.0 wt.-%, yet more preferably below 5.0 wt.-%, yet more preferably not detectable.

Typically the solid catalyst component (SC) is in a form of solid particles having a surface area, measured according to the commonly known BET method with $N_2$ gas as analysis adsorptive (ASTM D 3663), less than 20 $m^2/g$. In some embodiments the surface area is preferably less than 15 $m^2/g$, more preferably is less than 10 $m^2/g$. In some other embodiments, the solid catalyst particles show a surface area 5 $m^2/g$ or less, which is the lowest detection limit with the methods used in the present invention.

The solid catalyst particles can be additionally or alternatively defined by the pore volume measured according to ASTM 4641. Thus it is appreciated that the solid catalyst particles are of a pore volume of less than 1.0 ml/g. In some embodiments the pore volume is more preferably of less than 0.5 ml/g, still more preferably of less than 0.3 ml/g and even less than 0.2 ml/g. In another preferred embodiment the pore volume is not detectable when determined according to ASTM 4641.

Moreover the solid catalyst particles are typically of a mean particle size of not more than 500 μm, i.e. preferably in the range of 2 to 500 μm, more preferably 5 to 200 μm. It is in particular preferred that the mean particle size is below 150 μm, still more preferably below 100 μm. A preferred range for the mean particle size is 10 to 80 μm. In some embodiments mean particle size is preferably in the range of 10 to 60 μm.

As indicated above the solid catalyst component (SC) used in the present invention is most preferably in the form of spherical, compact particles having smooth surface. Further, particle size distribution is in a preferred embodiment narrow.

A further essential feature of the catalyst used in the present invention is that the catalyst is prepared without any phthalic compounds typically used as internal electron donor or donor precursor. In the present invention expressions "internal electron donor" and "internal donor" have the same meaning and can be used interchangeable.

Thus, the solid catalyst component used in the present invention is a solid Ziegler-Natta catalyst component, which comprises a compound of a transition metal of Group 4 to 6 of IUPAC, most preferably a titanium compound, a Group 1 to 3 metal compound, most preferably a magnesium compound and an internal electron donor (ID) being a non-phthalic compound. Thus, the catalyst is prepared without any undesired phthalic compounds, and thus the catalyst is featured to be a "non-phthalic catalyst component". Further, the solid catalyst is free of any external support material, like silica or $MgCl_2$, but the catalyst is self-supported.

The solid catalyst component in particulate form is obtainable by the following general procedure:
a) providing a solution of
  $a_1$) at least a Group 2 metal alkoxy compound (Ax) being the reaction product of a Group 2 metal compound and an alcohol (A) comprising in addition to the hydroxyl moiety at least one ether moiety optionally in an organic liquid reaction medium; or
  $a_2$) at least a Group 2 metal alkoxy compound (Ax') being the reaction product of a Group 2 metal compound and an alcohol mixture of the alcohol (A) and a monohydric alcohol (B) of formula ROH, where R is an alkyl of 2 to 16 C-atoms, optionally in an organic liquid reaction medium; or
  $a_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
  $a_4$) Group 2 metal alkoxy compound of formula $M(OR_1)_n(OR_2)_mX_{2-n-m}$ or mixture of Group 2 alkoxides $M(OR_1)_nX_{2-n}$ and $M(OR_2)_mX_{2-m}$, where M is Group 2 metal, X is halogen, $R_1$ and $R_2$ are different alkyl groups of C2 to C16 carbon atoms, and $0 \leq n' \leq 2$, $0 \leq m' \leq 2$ and $n+m \leq 2$, provided that both n and m are not simultaneously zero, $0 < n' \leq 2$ and $0 < m' \leq 2$; and b) adding said solution from step a) to at least one compound of a transition metal of Group 4 to 6 and c) obtaining the solid catalyst component particles, and adding a non-phthalic internal electron donor (ID) at any step prior to step c).

The internal donor (ID) or precursor thereof can thus added to the solution of step a) or to the transition metal compound before adding the solution of step a) into said transition metal compound, or after the addition of the solution of step a) into the transition metal compound.

According to the procedure above the solid catalyst can be obtained via precipitation method or via emulsion-solidification method depending on the physical conditions, especially temperature used in steps b) and c). Emulsion is also called liquid/liquid two-phase system.

In both methods (precipitation or emulsion-solidification) the catalyst chemistry is the same.

In the precipitation method combination of the solution of step a) with at least one transition metal compound in step b) is carried out and the whole reaction mixture is kept at least at 50° C., more preferably in the temperature range of 55 to 110° C., more preferably in the range of 70 to 100° C., to secure full precipitation of the catalyst component in the form of a solid particles (step c).

In the emulsion—solidification method in step b) the solution of step a) is typically added to the at least one transition metal compound at a lower temperature, such as in the range of −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

Preferably the Group 2 metal is magnesium.

The Group 2 metal, preferably magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds ($a_4$)) and used as such in the catalyst preparation process of the invention.

In a preferred embodiment in step a) the solution of $a_2$) or $a_3$) are used, i.e. a solution of (Ax') or a solution of a mixture of (Ax) and (Bx).

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol, 1,3-propylene-glycol-monobutyl ether and 3-butoxy-2-propanol, with 2-(2-ethylhexyloxy) ethanol, 1,3-propylene-glycol-monobutyl ether and 3-butoxy-2-propanol being particularly preferred.

Illustrative monohydric alcohols (B) are of formula ROH, with R being straight-chain or branched $C_2$-$C_{16}$ alkyl residue, preferably $C_4$ to $C_{10}$, more preferably $C_6$ to $C_8$ alkyl residue The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be similar or different $C_1$-$C_{20}$ alkyls, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Heptane and pentane are particular preferred.

The reaction for the preparation of the magnesium alkoxy compound may be carried out at a temperature of 0° C. to 80° C., suitable at a temperature of 20° C. to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, and derivatives thereof. Especially preferred internal donors are (di)esters of (di)carboxylic acids, in particular esters belonging to a group comprising malonates, maleates, substituted maleates, like citraconates, succinates, glutarates, cyclohexene-1,2-dicarboxylates and benzoates, and any derivatives thereof. Preferred examples are e.g. substituted maleates, like 2-methyl maleates, most preferably di-2-ethylhexyl citraconate.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene. The solid particulate product obtained by the precipitation or by the emulsion-solidification method may be washed at least once, preferably at least twice, most preferably at least three times with aromatic and/or aliphatic hydrocarbons, preferably with toluene, heptane or pentane and/or with $TiCl_4$. Washing solutions can also contain donors and/or compounds of Group 13, like trialkyl aluminium, halogenated alkyl aluminium compounds or alkoxy aluminium compounds. Aluminium compounds can also be added during the catalyst synthesis.

The catalyst can further be dried, as by evaporation or flushing with nitrogen, or it can be slurried to an oily liquid without any drying step.

The finally obtained solid catalyst component is desirably in the form of particles having generally an average particle size range of 5 to 200 μm, preferably 10 to 100 μm. Particles are compact with low porosity and have surface area below 20 g/m², more preferably below 10 g/m², or even below 5 g/m², i.e. below the detection limit. Typically the amount of Ti is 1-6 wt-%, Mg 10 to 20 wt-% and internal donor 10 to 40 wt-% in the solid catalyst component.

Detailed description of the preparation of catalysts used in the present invention are disclosed in WO 2012/007430, EP2610271, EP 261027 and EP2610272 which are incorporated here by reference.

As a further catalyst component in the instant polymerization process an external electron donor (ED) is preferably present. In the present invention expressions "external electron donor" and "external donor" have the same meaning and can be used interchangeable.

Suitable external donors (ED) include certain silanes, ethers, esters, amines, ketones, heterocyclic compounds and blends of these. It is especially preferred to use a silane. It is most preferred to use silanes of the general formula

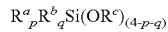

wherein $R^a$, $R^b$ and $R^c$ can be chosen independently from one another and can be the same or different and denote a hydrocarbon radical, in particular a linear alkyl or cycloalkyl group, and wherein p and q are numbers ranging from 0 to 3 with their sum p+q being equal to or less than 3. Examples of such commonly used silanes are, (cyclohexyl)(methyl)Si(OCH$_3$)$_2$, (phenyl)$_2$Si(OCH$_3$)$_2$ and (cyclopentyl)$_2$Si(OCH$_3$)$_2$.

Another group of silanes have the general formula

wherein $R^3$ and $R^4$ can be the same or different and represent a linear, branched or cyclic hydrocarbon group having 1 to 12 carbon atoms, preferably are ethyl.

Most preferably the external donors used in the present invention are selected from cyclohexylmethyl dimethoxy silane or dicyclopentyl dimethoxy silane, the latter being especially preferred.

In addition to the Ziegler-Natta catalyst and the optional external donor (ED) a co-catalyst can be used. The co-catalyst is preferably a compound of group 13 metal of the periodic table (IUPAC), e.g. organo aluminum, such as an aluminum compound, like aluminum alkyl, or aluminum alkyl halide compound. Accordingly in one specific embodiment the co-catalyst (Co) is a trialkylaluminium, like (C1-C6) trialkyl aluminium, especially triethylaluminium (TEAL), dialkyl aluminium halide, like (C1-C6) dialkyl aluminium chloride, especially diethyl aluminium chloride or alkyl aluminium dihalide, like (C1-C6) alkyl aluminium dichloride, especially ethyl aluminium dichloride or mixtures thereof. In one specific embodiment the co-catalyst (Co) is triethylaluminium (TEAL).

The molar ratio between the co-catalyst (Co) and the external donor (ED) [Co/ED] and/or the ratio between the co-catalyst (Co) and the transition metal (TM) [Co/TM] should be carefully chosen for each process.

The process of the present invention, where the solid Ziegler-Natta catalyst is self-supported, i.e. does not contain any external support material, and further, does not contain any phthalic compounds originating from the catalyst preparation, as described above, is used for producing propylene terpolymer composition of the invention, provides among other beneficial features as described in the present application effective conversion of the C4 to C8 α-olefin comonomers.

According to a preferred processes of the invention in alternative i) a C4-C8α-olefin, preferably a C4-C6α-olefin comonomer is fed into the first reactor (R-1) only, whereby any unreacted (co)monomers are transferred to the second reactor together with the polymer fraction (A) produced in (R-1), or in alternative ii) C4-C8α-olefin, preferably a C4-C6α-olefin comonomer is fed into the first reactor (R-1) and in addition to the unreacted (co)monomers from the first reactor additional C4-C8α-olefin, preferably a C4-C6α-olefin comonomer, being the same comonomer as fed into the first reactor (R-1), is fed to the second reactor (R-2), or in alternative iii) no C4-C8α-olefin, preferably a C4-C6α-olefin comonomer is fed into the first reactor (R-1), but only into the second reactor (R-2).

In a preferred embodiment a C4-C8 α-olefin comonomer, preferably a C4-C6 α-olefin comonomer, is fed into the first reactor (R-1) and optionally an additional C4-C8 α-olefin, preferably a C4-C6 α-olefin comonomer, is fed to the second reactor (R-2). Thus, alternatives i) and ii) above are more preferred.

As indicated above, the most preferred C4-C8 α-olefin comonomer is 1-butene.

In the preferred process ethylene is present in both reactors (R-1) and (R-2). The ethylene feed is controlled to have the ethylene content in the reactors of at least 0.3 wt-%, preferably of at least 0.5 wt-%. Ethylene content more than 3 wt-% is not desired.

The invention provides a process for producing propylene terpolymer composition with an C4-C8 α-olefin and ethylene comonomers, where the conversion of the C4-C8 α-olefin comonomer is higher than with the similar type process of prior art, and even using a similar type of catalyst of prior art, which, however, comprises as an internal donor or donor precursor a phthalic compound, whereas in the present invention a catalyst without any phthalic compound, like a phthalic internal electron donor, is used. According to the present invention, especially comonomer conversion in the second reactor of the multistage polymerisation process is improved compared to prior art processes.

Better comonomer conversion results in better process economics, i.e. smaller amount of comonomer needs to be fed into the process to reach the same level of comonomer content as with a prior art process, in decreased need for removing and after-treating of the unreacted monomers, and finally in improved polymer properties.

Further, the invention provides propylene terpolymer compositions produced by the process of the invention.

In addition the present invention provides propylene terpolymer compositions having desired properties as described in detail below.

It has been surprisingly found that the propylene polymer composition, especially propylene terpolymer composition, prepared as described above, has a low heat sealing initiation temperature (SIT), good hot tack properties (like good hot tack force vs. temperature), low hexane solubles, and low cold xylene solubles (XCS) in relation to high melt temperature and vice a versa, in combination with desired process related properties, like good comonomer conversion.

In the following the propylene composition (P) obtainable by, preferably obtained by the method of the invention is defined in more detail.

The propylene terpolymer compositions (P) according to this invention comprise, as described above propylene and a comonomer selected from C4 to C8 α-olefin monomers and ethylene. Preferably the C4 to C8 α-olefin comonomer is C4 to C6 α-olefin, more preferable 1-butene or 1-hexene, especially 1-butene.

The propylene terpolymer composition according to this invention shall have an ethylene content of at least 0.3 wt-%. Thus it is preferred that the propylene terpolymer composition according to this invention has ethylene content in the range of 0.3 wt-% to 3 wt-%, more preferably in the range of 0.5 to 3.0 wt-%, still more preferably in the range of 0.8 to 2.5 wt-%.

Moreover, the propylene terpolymer composition according to this invention shall have a C4 to C8 α-olefin content of at least 4.5 wt-%, preferably in the range form 4.5 to 14 wt-%, more preferably from 6 to 14 wt-%, still more preferably from 6 wt-% to 12 wt-%.

Preferably the α-olefin is a C4 to C6 α-olefin, and most preferably 1-butene or 1-hexene, especially 1-butene.

Thus, in one preferred embodiment the propylene terpolymer comprises 0.5 to 3 wt-% ethylene and 4.5 to 14 wt-% of C4 to C6 α-olefin. In another preferred embodiment the ethylene content is 0.8 to 2.5 wt-% and C4 to C6 α-olefin content is 6 to 14 wt-%. In a further preferred embodiment C4 to C6 α-olefin content is 6 to 12 wt-% and ethylene content is 0.8 to 2.5 wt-%. The same ranges and all preferred ranges apply to the preferred comonomers, i.e. 1-butene or 1-hexene, especially 1-butene.

The propylene terpolymer composition of the present invention or prepared by the process of the invention has a combined content of ethylene and C4 to C6 α-olefin in the range of 5.0 to 17 wt-%.

Ethylene and other comonomer contents of the polymer fraction (B) are not possible to measure, but can be calculated based on the contents of the fraction (A) and final composition (P) and production split between the reactors.

The propylene polymer fraction (A) may have the same or a different ethylene content as the final propylene terpolymer composition, preferably the ethylene contents are close to each other, thus the ethylene content of the polymer fraction (B) produced in the second reactor is also close to the ethylene content of polymer (A).

The propylene polymer fraction (A) may have the same or a different C4-C8-α-olefin comonomer content as the final propylene terpolymer composition (P), preferably the C4-C8-α-olefin comonomer content of the final polymer composition (P) is higher than that of polymer fraction (A). Subsequently the calculated C4-C8-α-olefin content of polymer fraction (B) is higher than that of polymer (A).

The propylene propylene terpolymer composition has a melt flow rate $MFR_2$ (2.16 kg load, 230° C.) measured according to ISO 1133, in the range of 1.0 to 50.0 g/10 min, preferably in the range of 2.0 to 40 g/10 min, more preferably in the range of 2.0 to 30 g/10 min, especially in the range of 3.0 to 30 g/10 min.

The propylene polymer fraction (A), preferably propylene terpolymer fraction (A) has a melt flow rate $MFR_2$ (2.16 kg load, 230° C.) measured according to ISO 1133, in the range of 1.0 to 50.0 g/10 min, preferably 2.0 to 40.0 g/10 min, more preferably 2.0 to 30.0 g/10 min.

The propylene polymer fraction (B) has a calculated melt flow rate $MFR_2$ (2.16 kg load, 230° C.) according to ISO 1133 in the range of 1.0 to 50.0 g/10 min, preferably 2.0 to 40.0 g/10 min, more preferably 2.0 to 30.0 g/10 min, like 3.0 to 20.0 g/10 min.

The melt flow rate $MFR_2$ of propylene polymer fraction (A) may be the same or different from that of propylene polymer fraction (B).

According to the process of the invention, in which process as a catalyst component is used a solid, self-supported Ziegler-Natta catalyst component not comprising any phthalic compounds, it is possible to achieve a propylene terpolymer composition having a melt temperature at the same level or even lower than propylene terpolymer composition with the same comonomers and having approximately the same comonomer contents, but produced with a catalyst including a phthalic compound as an internal donor.

As mentioned above, the inventive propylene polymer compositions shall be especially suitable for the packaging industry. Accordingly, good sealing properties are desired, like rather low heat sealing initiation temperature (SIT) and high hot tack force vs. temperature. Further, a broad sealing window temperature range, i.e. a broad temperature range between the sealing end and initiation temperatures (SET and SIT), is achieved with the terpolymer composition of the invention.

Further, the inventive compositions have a combination of low xylene cold solubles in relation to higher melt temperature and vice a versa, i.e. higher xylene cold solubles in relation to low melt temperature.

In addition low amount of volatile compounds and low hexane solubles (FDA) is a feature especially desired in many applications. Good comonomer conversion in the process, i.e. the amount of unreacted comonomers remaining in the polymer recovered from the reactor is one reason for lower amount of volatiles of the final polymer composition.

Combination of the process benefits and disclosed features of the polymer compositions, especially of the propylene terpolymer compositions of the invention, or produced by the inventive method of the invention results in is a surprisingly good product.

The melting temperature ($T_m$) measured according to ISO 11357-3 of the propylene terpolymer composition of the invention is at most 145° C., but at least 120° C. Thus it is appreciated that the melting temperature ($T_m$) measured according to ISO 11357-3 of the propylene terpolymer composition is in the range of 120 to 145° C., preferably in the range of 120 to 140° C., more preferably in the range of 125 to 140° C. The melt temperature is dependent on the amount of comonomers. When the comonomer content increases, the melting temperature decreases.

Additionally, the propylene terpolymer composition of the invention has a crystallization temperature (TO measured according to ISO 11357-3 of at least 85° C., more preferably of at least 88° C. Accordingly the propylene terpolymer has preferably a crystallization temperature (TO measured according to ISO 11357-3 in the range of 85 to 105° C., more preferably in the range of 88 to 100° C.

The present invention further has the advantage that the content of volatile organic compounds (VOC) of the propylene polymer compositions (P) is very low determined by the method as disclosed in the experimental part. The volatile compounds of the compositions are measured after the purge bin located directly after the last operating polymerisation reactor.

SIT is defined in the present application to be the minimum sealing temperature required to form a seal of significant strength, which is defined to be in this application 3.0 N. The method is described in detail in the experimental part.

Accordingly, it is preferred that the propylene terpolymer composition has a heat sealing initiation temperature (SIT) of equal or less than 118° C., preferably in the range of 90 to 115° C. ° C., more preferably in the range of 95 to less than 112° C. Further, the temperature range between SET and SIT (SET-SIT) is broader with the inventive polymer compositions than with the comparative polymer compositions, indicating a broad sealing window. The range SET-SIT is at least 28° C., preferably at least 30° C. with the inventive compositions, whereas the range SET-SIT is clearly narrower with the comparative compositions as disclosed in the experimental part.

Additionally the propylene polymer compositions (P) of the present invention or produced by the inventive method can be defined by the xylene cold soluble (XCS) content measured according to ISO 6427. Accordingly the propylene polymer composition, preferably propylene terpolymer composition, is preferably featured by a xylene cold soluble (XCS) content of below 30 wt.-%, more preferably of below 25 wt.-%. Thus it is in particular appreciated that the propylene terpolymer composition of the instant invention has a xylene cold soluble (XCS) content in the range of 1 to 30 wt.-%, more preferably in the range of 2 to 25 wt.-%.

Also hexane solubles (FDA) are lower with the inventive compositions than with the comparative compositions.

The propylene terpolymer compositions of the invention may contain additives known in the art, like antioxidants, nucleating agents, slip agents and antistatic agents. The polymer fraction, preferably the sum of the propylene polymer fraction (A) and the propylene terpolymer fraction (B), is at least 90 wt.-%, more preferably at least 95 wt.-%, still more preferably at least 98 wt.-%, like at least 99 wt.-%.

Further the invention is directed to the use of the instant propylene polymer composition (P) as a film, like a cast film, an extrusion blown film or a biaxially oriented polypropylene (BOPP) film. The propylene polymer compositions of the present invention can be also used as a coating of an extrusion coated substrate.

In the following the present invention is further illustrated by means of examples.

EXAMPLES

Measuring Methods

Calculation of the ethylene and 1-butene or 1-hexene content, respectively, of the propylene terpolymer fraction (B):

$$\frac{C(R2) - w(A) \times C(A)}{w(B)} = C(B)$$

wherein
w(A) is the weight fraction of the propylene co- and terpolymer fraction (A), i.e. the product of the first reactor (R-1),
w(B) is the weight fraction of the propylene terpolymer fraction (B), i.e. of the polymer produced in the second reactor (R-2),
C(A) is the ethylene or C4 to C8 α-olefin content [in wt.-%] of the propylene co- and terpolymer fraction (A), i.e. of the product of the first reactor (R1),
C(R2) is the ethylene or C4 to C8 α-olefin content [in wt.-%] of the product obtained in the second reactor (R2), i.e. the propylene terpolymer composition (P),
C(B) is the calculated ethylene or C4 to C8 α-olefin content [in wt.-%] of the propylene terpolymer fraction (B).

Calculation of the xylene cold soluble (XCS) content of the propylene terpolymer fraction (B):

$$\frac{XS(R2) - w(A) \times XS(A)}{w(B)} = XS(B)$$

wherein
w(A) is the weight fraction of the propylene co- and terpolymer fraction (A), i.e. the product of the first reactor (R1),
w(B) is the weight fraction of the propylene terpolymer fraction (B), i.e. of the polymer produced in the second reactor (R2),
XS(A) is the xylene cold soluble (XCS) content [in wt.-%] of the propylene co- and terpolymer fraction (A), i.e. of the product of the first reactor (R1),
XS(R2) is the xylene cold soluble (XCS) content [in wt.-%] of the product obtained in the second reactor (R2), i.e. the propylene terpolymer composition (P),
XS(B) is the calculated xylene cold soluble (XCS) content [in wt.-%] of the propylene terpolymer fraction (B).

Calculation of melt flow rate $MFR_2$ (230° C.) of the propylene terpolymer fraction (B):

$$MFR(B) = 10^{\left[\frac{\log(MFR(P)) - w(A) \times \log(MFR(A))}{w(B)}\right]}$$

wherein
w(A) is the weight fraction of the propylene co- and terpolymer fraction (A), i.e. the product of the first reactor (R1),
w(B) is the weight fraction of the propylene terpolymer fraction (B), i.e. of the polymer produced in the second reactor (R2),
MFR(A) is the melt flow rate $MFR_2$ (230° C.) [in g/10 min] of the propylene co- and terpolymer fraction (A),
MFR(P) is the melt flow rate $MFR_2$ (230° C.) [in g/10 min] of the product obtained in the second reactor (R2), i.e. the propylene terpolymer composition (P),
MFR(B) is the calculated melt flow rate $MFR_2$ (230° C.) [in g/10 min] of the propylene terpolymer fraction (B).

$MFR_2$ (230° C.) is measured according to ISO 1133 (230° C., 2.16 kg load).

Content of Ethylene

Ethylene content in propylene polymer was measured by Fourier-transform infrared (FTIR) spectroscopy. A thin film of the sample (thickness approximately 0.3 mm) prepared by hot-pressing. The area of —CH2-absorption peak 720+730 cm-1 was measured using baseline 762-694 cm-1. The area of reference peak at 4323 cm-1 was measured using baseline 4650-4007 cm-1. The method was calibrated by ethylene content data measured by 13C NMR. The calibration procedure should be undertaken within the vendor software using a quadratic function:

$$W_E = C_2 \times A_0^2 + C_1 \times A_0 + C_0$$

where
$W_E$ is the ethylene content of the copolymer in units of weight percent;
$A_0$ is the area of the quantitative band normalised to that of the reference band;
$C_2$ is the quadratic calibration coefficient (curvature);
$C_1$ is the linear calibration coefficient (slope);
$C_0$ is the offset calibration coefficient (offset);

Content of 1-Butene Comonomer

The 1-butene content in propylene polymer was measured by using FTIR according to the following procedure. A thin film of the sample (thickness approximately 0.45 mm) prepared by hot-pressing. The butene content was determined measuring the area of peak 767 cm-1 and using the baseline between 780 and 750 cm-1. The height of reference peak at 4323 cm-1 was measured between 4323 and 4700 cm-1. The method was calibrated by butene content data measured by 13C NMR.

The 1-butene content was calculated as following equation $$\text{Butene } (w-\%) = B * \frac{\text{Area(butene peak 767 cm}-1)}{\text{abs 4323 (cm}-1) - \text{abs 4700 (cm}-1)} + C$$

B is the linear calibration coefficient (slope)
C is the offset calibration coefficient (offset)

Xylene Cold Soluble (XCS)

The amount of xylene solubles was determined based on the principles ISO 16152; first edition; 2005-07-01. at 25° C., but using the following conditions: A weighed amount of a sample was dissolved under reflux conditions for 1 h. The solution was first cooled for 60 min at room temperature and then maintained at 25° C. for 200 min to achieve the complete crystallization of the insoluble fraction. After filtration and solvent evaporation the amount of xylene soluble fraction was gravimetrically determined.

Hexane Solubles

Hexane solubles (wt.-%): determined in accordance with FDA section 177.1520 1 g of a polymer cast film of 100 µm thickness (produced on a PM30 cast film line using chill-roll temperature of 40° C.) is extracted 400 ml hexane at 50° C. for 2 hours while stirring with a reflux cooler. After 2 hours the mixture is immediately filtered on a filter paper N° 41. The precipitate is collected in an aluminium recipient and the residual hexane is evaporated on a steam bath under N2 flow. The precipitate was weighted again and hexane solubles were calculated.

Determination of Volatile Compounds:

The volatile components were determined by using a gas chromatograph and a headspace method. The equipment was a Agilent gas chromatograph with a 30 m×0.25 mm×1 µm (length×diameter×size of packing material) non-polar column filled with DB-1 (100% dimethyl polysiloxane). A flame ionisation detector was used with hydrogen as a fuel gas and air. Helium was used as a carrier gas with a flow rate of 1.3 ml/min. After the injection of the sample the oven temperature was maintained at 40° C. for 5 minutes, after which it was increased at a rate of 10° C./min until it reached 250° C. Then the oven was maintained at that temperature for 4 minutes, after which the analysis was completed.

The calibration was carried out as follows: At least three reference solutions were prepared, weighing 4 µl n-octane into a 20 ml injection flask, which was thermostated to 120° C. and analysed. A calibration factor Rf can be calculated in the following manner: Rf=C/A, where C=amount of n-octane (mg) and A=area of peak.

The analysis was conducted as follows: The polymer sample (about 2000±20 milligrams) was placed in the 20 ml injection flask, which was thermostated to 120° C. and kept at that temperature for one hour. A gas sample from the injection flask was then injected into the GC. The hydrocarbon emission E was then calculated as follows:

$$E(\text{mg/kg}) = \frac{\text{sum of areas of peaks} \times Rf}{\text{sample weight (mg)}} \times 1000000$$

$$R_f = \text{factor (n-octane)}$$

The sum of areas of peaks are grouped as indicated in Table 2.

DSC Analysis, Melting Temperature Tm and Crystallisation Temperature Tc were measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization (Hc) are determined from the cooling step, while melting temperature (Tm) and heat of fusion (Hf) are determined from the second heating step.

Sealing Initiation Temperature (SIT); Sealing End Temperature (SET), Sealing Range:

The method determines the sealing temperature range (sealing range) of polypropylene films, in particular blown films or cast films. The sealing temperature range is the temperature range, in which the films can be sealed according to conditions given below.

The lower limit (heat sealing initiation temperature (SIT)) is the sealing temperature at which a sealing strength of >3 N is achieved. The upper limit (sealing end temperature (SET)) is reached, when the films stick to the sealing device.

The sealing range is determined on a J&B Universal Sealing Machine Type 3000 with a film of 100 µm thickness produced on a monolayer cast film line with a melt temperature of 220° C. and a chill roll temperature of 20° C. with the following further parameters:

Specimen width: 25.4 mm
Seal Pressure: 0.1 N/mm$^2$
Seal Time: 0.1 sec
Cool time: 99 sec
Peel Speed: 10 mm/sec
Start temperature: 80° C.
End temperature: 150° C.
Increments: 10° C.
specimen is sealed A to A at each seal bar temperature and seal strength (force) is determined at each step.

The temperature is determined at which the seal strength reaches 3 N.

Hot Tack Force:

The hot tack force is determined on a J&B Hot Tack Tester with a film of 100 µm thickness produced on a monolayer cast film line with a melt temperature of 220° C. and a chill roll temperature of 20° C. with the following further parameters:

Specimen width: 25.4 mm
Seal Pressure: 0.3 N/mm$^2$
Seal Time: 0.5 sec
Cool time: 99 sec
Peel Speed: 200 mm/sec
Start temperature: 90° C.
End temperature: 140° C.
Increments: 10° C.

The maximum hot tack force, i.e the maximum of a force/temperature diagram is determined and reported.

Surface Area:

BET with $N_2$ gas ASTM D 3663, apparatus Micromeritics Tristar 3000:

sample preparation at a temperature of 50° C., 6 hours in vacuum.

Pore volume was measured according to ASTM 4641.

Mean particle size is given in μm and measured with Coulter Counter LS200 at room temperature with n-heptane as medium.

Examples

Catalyst Preparation 1 (Comparative Catalyst)—C-CAT

The solid catalyst component was prepared according to the emulsion-solidification method as described in Example 8 of WO 2004/029112, except that diethylaluminium chloride was used as an aluminium compound instead of triethylaluminium. Catalyst has a surface area measured by BET method below 5 m$^2$/g, i.e. below the detection limit.

Catalyst Preparation 2 (Inventive Catalyst)—I-CAT

Catalyst is prepared using emulsion-solidification method, thus according to the same basic principles as in comparative catalyst. However, no phthalic compounds were used in catalyst synthesis. In detail, the catalyst is prepared as follows:

3.4 liter of 2-ethylhexanol and 810 ml of propylene glycol butyl monoether (in a molar ratio 4/1) were added to a 20 l reactor. Then 7.8 liter of a 20% solution in toluene of BEM (butyl ethyl magnesium) provided by Crompton GmbH was slowly added to the well stirred alcohol mixture. During the addition the temperature was kept at 10° C. After addition the temperature of the reaction mixture was raised to 60° C. and mixing was continued at this temperature for 30 minutes. Finally, after cooling to room temperature the obtained Mg-alkoxide was transferred to storage vessel.

21.2 g of Mg alkoxide prepared above was mixed with 4.0 ml bis(2-ethylhexyl) citraconate for 5 min. After mixing the obtained Mg complex was used immediately in the preparation of catalyst component.

19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 1.0 ml of a toluene solution with 2 mg Necadd 447 and 24.0 ml of heptane were added to form an emulsion. Mixing was continued for 30 minutes at 25° C. Then the reactor temperature was raised to 90° C. within 30 minutes. The reaction mixture was stirred for further 30 minutes at 90° C. Afterwards stirring was stopped and the reaction mixture was allowed to settle for 15 minutes at 90° C.

The solid material was washed with 100 ml of toluene, with of 30 ml of TiCl$_4$, with 100 ml of toluene and two times with 60 ml of heptane. 1 ml of donor was added to the two firsts washings. Washings were made at 80° C. under stirring 30 min with 170 rpm. After stirring was stopped the reaction mixture was allowed to settle for 20-30 minutes and followed by siphoning.

Afterwards stirring was stopped and the reaction mixture was allowed to settle for 10 minutes decreasing the temperature to 70° C. with subsequent siphoning, and followed by N2 sparging for 20 minutes to yield an air sensitive powder.

Catalyst has a surface area measured by BET method below 5 m$^2$/g, i.e. below the detection limit.

Polymerisation

A stirred tank reactor having a volume of 45 dm$^3$ was operated as liquid-filled at a temperature of 30° C. and a pressure of 50 bar. Into the reactor was fed propylene so much that the average residence time in the reactor was 0.3 hours together with hydrogen and polymerization catalyst component with triethyl aluminium (TEA) as a cocatalyst and dicyclopentyldimethoxysilane (DCPDMS) as external donor in amounts as indicated in Table 1.

The slurry from this prepolymerization reactor was directed to a loop reactor having a volume of 150 dm$^3$ together with 150 kg/h of propylene. The loop reactor was operated at a pressure of 55 bar. The amounts of hydrogen, ethylene and 1-butene introduced into the reactor as disclosed in Table 1

The polymer slurry from the loop reactor was directly conducted into a gas phase reactor. Into the gas phase reactor additional propylene, ethylene and hydrogen were fed as disclosed in Table 1.

The reaction mixture from the gas phase reactor was introduced into a purge bin where a settled bed of copolymer was purged with a purge gas containing nitrogen and steam. The average residence time of the polymer in the purge bin was 30 minutes at a temperature of 60° C.

The polymer withdrawn from the reactor was mixed with additives. All products were stabilized with 0.2 wt.-% of Irganox B225 (1:1-blend of Irganox 1010 and Irgafos 168) of BASF AG, Germany) and 0.1 wt.-% calcium stearate.

The mixture of polymer and additives was then extruded to pellets by using a ZSK70 extruder (product of Coperion) under nitrogen atmosphere and final polymer properties were measured.

Polymerisation conditions and polymer properties are disclosed in Table 1.

TABLE 1

| Polymerisation conditions and polymer properties | | | | | | | |
|---|---|---|---|---|---|---|---|
| Example | IE1 | IE2 | IE3 | CE1 | CE2 | CE3 | CE4 |
| Catalyst component | I-CAT | I-CAT | I-CAT | I-CAT | I-CAT | I-CAT | C-CAT |
| Prepolymerisation | | | | | | | |
| Ethylene feed (kg/h) | 0.1 | 0.1 | 0.1 | 0.1 | — | — | 0.2 |
| TEAL/ext. donor (mol/mol) | 12 | 12 | 12 | 10 | 5 | 5 | 9 |
| TEAL/Ti (mol/mol) | 225 | 144 | 141 | 167 | 167 | 90 | 50 |

TABLE 1-continued

Polymerisation conditions and polymer properties

| Example | IE1 | IE2 | IE3 | CE1 | CE2 | CE3 | CE4 |
|---|---|---|---|---|---|---|---|
| Loop reactor | | | | | | | |
| Temperature (° C.) | 70 | 65 | 62 | 70 | 70 | 70 | 67 |
| H2/C3 ratio (mol/kmol) | 1.6 | 1.2 | 1.4 | 1.0 | 0.5 | 1.3 | 2.1 |
| C2/C3 ratio (mol/kmol) | 2.2 | 2.3 | 4.7 | 1.9 | 7.6 | 12.2 | 5.1 |
| C4 feed (kg/h) | 30 | 42 | 46 | 11 | — | — | 32 |
| Split % | 56 | 36 | 35 | 55 | 55 | 45 | 45 |
| MFR2 (g/10 min) | 6.4 | 7.6 | 5.9 | 7.2 | 3.0 | 2.2 | 9.3 |
| XS (%) | 3.6 | 6.6 | 8.9 | 7.2 | 7.9 | 1.6 | 5.0 |
| C4 content (wt-%) | 6.4 | 6.5 | 6.6 | 3.0 | — | — | 7.2 |
| C2 content (wt %) | 0.7 | 0.9 | 1.7 | 0.7 | 3.7 | 5.4 | 1.3 |
| Gas phase reactor | | | | | | | |
| Temperature (° C.) | 75 | 75 | 75 | 75 | 85 | 80 | 70 |
| C2/C3 feed (mol/kmol) | 12 | 9 | 19 | 10 | 28 | 39 | 18 |
| H2/C3 feed (mol/kmol) | 18 | 20 | 25 | 14 | 2.0 | 6.6 | 68 |
| C4/C3 feed (mol/kmol) | — | 169 | 176 | — | — | — | 26 |
| Split | 44 | 64 | 65 | 45 | 45 | 55 | 55 |
| MFR2 (g/10 min) | 5.0 | 7.4 | 7.7 | 6.5 | 1.2 | 1.1 | 7.1 |
| XS (%) | 4.4 | 6.7 | 20.1 | 5.6 | nm | nm | 7.1 |
| C4 content (wt-%) | 6.4 | 8.0 | 8.3 | 3.0 | — | — | 7.4 |
| C2 content (wt-%) | 1.1 | 1.1 | 2.2 | 1.1 | 4.2 | 6.2 | 1.8 |
| Production rate (kgPP/h) | 55 | 79 | 87 | 27 | | | 50 |
| C4 Comonomer conversion (%) * | 11.7 | 15.0 | 15.7 | 7.4 | — | — | 11.5 |
| Final product | | | | | | | |
| Tm (° C.) | 140 | 136 | 130 | 149 | 140 | 135 | 133 |
| Tc (° C.) | 103 | 96 | 90 | 111 | 97 | 95 | 98 |
| C2 (wt-%) | 1.0 | 1.1 | 2.2 | 1.0 | 4.2 | 6.2 | 1.8 |
| C4 (wt-%) | 6.7 | 7.9 | 8.3 | 3.1 | — | — | 7.4 |
| (C2 + C4) (wt-%) | 8.0 | 9.0 | 10.0 | 4.1 | 6.0 | 6.9 | 9.2 |
| XCS (%) | 4.4 | 8.1 | 24.3 | 5.2 | 8.0 | 14.0 | 10.7 |
| MFR2 (g/10 min) | 5.0 | 7.2 | 6.6 | 6.8 | 8.0** | 1.5 | 6.4 |
| C6solubles(FDA) | 2.3 | 2.6 | 2.5 | 2.3 | 2.7 | 3.2 | 3.6 |

* C4 Comonomer conversion is calculated according to the formula: (C4 Comonomer amount in product, wt-%) × (Production rate kgPP/h)/(C4 Comonomer amount in feed kg/h).
**The polymer of CE2 was visbroken from MFR2 1.2 g/10 min by using a co-rotating twin-screw extruder at 200-230° C. and using an appropriate amount of (tert.-butylperoxy)-2,5-dimethylhexane (Trigonox 101, distributed by Akzo Nobel, Netherlands) to achieve the target $MFR_2$ of 8.0 g/10 min.

Sealing properties of the final polymer are disclosed in Table 2.

TABLE 2

| Example | IE1 | IE2 | IE3 | CE1 | CE2 | CE3 | CE4 |
|---|---|---|---|---|---|---|---|
| SIT(° C.) | 118 | 111 | 104 | 125 | 115 | 125 | 102 |
| SET(° C.) | 150 | 142 | 135 | 150 | 140 | 107 | 122 |
| SET − SIT (° C.) | 32 | 31 | 31 | 25 | 25 | 18 | 20 |
| Hottack (N/24.5 mm) | 2.51 | 1.94 | 2.17 | 2.4 | n.m | 2.1 | 2.7 |
| Hottack temp. (° C.) | 105 | 96 | 90 | 117 | n.m | 111 | 95 |

Volatile Contents

Volatile contents of polymers produced according to the examples IE1, IE3 and comparative example CE4 are given in Table 3.

TABLE 3

Volatile contents

| | Column area, wt-ppm | | | | | |
|---|---|---|---|---|---|---|
| | C-C2 | C3-C4 | C5 | C6 | C7-C8 | C9 | C12 |
| CE4(C2/C3/C4) | 1.8 | 650 | 250 | 35 | 24 | 8.4 | 5.3 |
| IE1((C2/C3/C4) | 3.0 | 1.0 | 14.1 | 20 | 9.7 | 6.2 | 5.3 |
| IE3(C2/C3/C4) | <0.5 | 5.2 | 5.7 | <0.5 | 3.4 | <0.5 | 2.7 |

As can be seen from Table 1 good comonomer conversion is achieved when the non-phthalic catalyst is used in inventive terpolymerisation examples. Consequently clearly lower amount of volatiles could be seen with the inventive terpolymer produced by the method of the invention (Table 3) compared to corresponding terpolymers prepared by the comparative method.

Properties of propylene terpolymer compositions prepared according to the present invention (IE1, IE2 and IE3), i.e. using catalyst (I-CAT) have been analysed and compared with propylene terpolymer compositions having lower C4 content than in inventive terpolymers (CE1 with I-CAT) and also compared with a propylene terpolymer with similar amounts of comonomer, but produced with the comparative catalyst C-CAT (CE4), Comparison was also made with propylene-ethylene copolymers (CE2 and CE3).

Further, sealing window (SET-SIT) is clearly broader with the inventive terpolymer compositions than with the terpolymer produced by the comparative catalyst.

The invention claimed is:

1. A process for the preparation of propylene polymer compositions (P) by polymerizing propylene with a C4 to C8 α-olefin comonomer and ethylene in a sequential polymerization process comprising at least two reactors connected in series, wherein said process comprises the steps of:
   (A) polymerizing in a first reactor (R-1) propylene, optionally a C4 to C8 α-olefin comonomer and optionally ethylene, and obtaining a propylene polymer fraction (A), (B) transferring said propylene polymer fraction (A), optionally with unreacted propylene monomers and optionally with the unreacted ethylene and C4 to C8 α-olefin comonomers from the first reactor into a second reactor (R-2),
(C) feeding to said second reactor (R-2) additional propylene, optionally additional C4 to C8 α-olefin comonomer and optionally additional ethylene,
(D) polymerizing propylene, optionally C4 to C8 α-olefin comonomer and optionally ethylene in said second reactor (R-2), in the presence of said propylene polymer fraction (A), and
obtaining the propylene polymer composition (P) comprising the propylene polymer fraction (A) and a propylene polymer fraction (B) produced in said second reactor (R-2),
wherein the C4 to C8 α-olefin and the ethylene comonomers are fed at least to one of the reactors (R-1) and (R-2), and wherein the propylene composition (P) is a terpolymer that comprises C4 to C8 α-olefin comonomer in an amount of at least 4.5 wt-%, and
wherein,
the polymerization takes place in the presence of a solid catalyst component (SC),
i) having a surface area measured according to ASTM D 3663 of less than 20 m$^2$/g,
ii) that is free of any external carrier material, and
iii) comprising:
(a) a transition metal compound selected from one of the groups 4 to 6 of the periodic table (IUPAC),
(b) a compound of a metal selected from one of the groups 1 to 3 of the periodic table (IUPAC), and
(c) a non-phthalic internal electron donor (ID), and
wherein said solid catalyst component (SC) does not contain any phthalic compounds.

2. The process according to claim 1, wherein the non-phthalic internal electron donor (ID) is selected from (di) esters of non-phthalic (di)carboxylic acids, 1,3-diethers, and derivatives thereof.

3. The process according to claim 1 wherein the transition metal compound is a compound of the group 4 metal and the compound of a group 1 to 3 metal is compound of group 2 metal.

4. The process according to claim 1, wherein the catalyst comprises a cocatalyst of an organoaluminium compound and an external donor selected from silanes of the general formula:

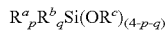

wherein R$^a$, R$^b$ and R$^c$ are chosen independently from one another and can be the same or different and denote a linear alkyl or cycloalkyl group, and wherein p and q are numbers ranging from 0 to 3 with their sum p+q being equal to or less than 3.

5. The process according to claim 1, wherein the first reactor (R-1) is a slurry reactor and the second reactor (R-2) is a gas phase reactor.

6. The process according to claim 1, wherein in the first reactor (R-1) the polymerization temperature is in the range of 60° C. to 85° C., and in the second reactor (R-2) the polymerization temperature is in the range of 65° C. to 85° C.

7. The process according to claim 1, wherein the propylene polymer composition (P) is a terpolymer having a C4 to C8 α-olefin comonomer content in the range of 4.5 wt % to 14 wt %, and ethylene content in the range of 0.5 to 3.0 wt-%.

8. The process according to claim 1, wherein the propylene terpolymer composition has a combined content of ethylene and C4 to C8 α-olefin comonomer in the range of 5.0 to 17 wt %.

9. The process according to claim 1, wherein the C4 to C8 α-olefin comonomer is 1-butene or 1-hexene.

10. The process according to claim 1, wherein the catalyst is prepared by a method comprising:
a) providing a solution of:
a$_1$) at least a Group 2 metal alkoxy compound (Ax), the Group 2 metal alkoxy compound (Ax) being the reaction product of a Group 2 metal compound and an alcohol (A) comprising in addition to the hydroxyl moiety at least one ether moiety optionally in an organic liquid reaction medium; or
a$_2$) at least a Group 2 metal alkoxy compound (Ax'), the Group 2 metal alkoxy compound (Ax') being the reaction product of a Group 2 metal compound and an alcohol mixture of the alcohol (A) and a monohydric alcohol (B) of formula ROH, where R is an alkyl of 2 to 16 C-atoms, optionally in an organic liquid reaction medium; or
a$_3$) a mixture of the Group 2 metal alkoxy compound (Ax) and a Group 2 metal alkoxy compound (Bx) that is the reaction product of a Group 2 metal compound and the monohydric alcohol (B), optionally in an organic liquid reaction medium; or
a$_4$) Group 2 metal alkoxy compound of formula M(OR$_1$)$_n$(OR$_2$)$_m$X$_{2-n-m}$ or mixture of Group 2 alkoxides M(OR$_1$)$_n$X$_{2-n'}$ and M(OR$_2$)$_m$X$_{2-m'}$ where M is Group 2 metal, X is halogen, R$_1$ and R$_2$ are different alkyl groups of C$_2$ to C$_{16}$ carbon atoms, and 0<n<2, 0<m<2 and n+m<2, provided that both n and m are not simultaneously zero, 0<n'<2 and 0<m'<2; and
b) adding said solution from step a) to at least one compound of a transition metal of Group 4 to 6 and
c) obtaining the solid catalyst component particles, and adding a non-phthalic internal electron donor (ID) at any step prior to step c).

11. The process according to claim 1, wherein the propylene polymer composition (P) has a melting temperature in the range of 120° C. to 145° C.

12. The process according to claim 1, wherein the propylene composition (P) has a MFR$_2$ in the range of 1 to 50 g/10 min.

* * * * *